United States Patent
Freiling et al.

(10) Patent No.: US 9,342,863 B2
(45) Date of Patent: May 17, 2016

(54) VIRTUALIZING APPLICATIONS FOR PER-MONITOR DISPLAYING

(71) Applicant: Microsoft Technology Licensing, LLC, Redmond, WA (US)

(72) Inventors: Peter Benjamin Freiling, Seattle, WA (US); Ian Hanschen, Seattle, WA (US); Stephen Harry Wright, Snohomish County, WA (US); Thomas W Olsen, Issaquah, WA (US); Mohamed A. M. Sadek, Redmond, WA (US); Lindsay Kubasik, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 13/917,294

(22) Filed: Jun. 13, 2013

(65) Prior Publication Data

US 2014/0368548 A1 Dec. 18, 2014

(51) Int. Cl.
*G06T 3/40* (2006.01)
*G06F 3/14* (2006.01)

(52) U.S. Cl.
CPC ............... *G06T 3/40* (2013.01); *G06F 3/1423* (2013.01); *G09G 2340/0414* (2013.01); *G09G 2340/0421* (2013.01)

(58) Field of Classification Search
CPC G06T 3/40; G06F 3/1423; G09G 2340/0421; G09G 2340/0414
See application file for complete search history.

(56) References Cited

U.S. PATENT DOCUMENTS

| | | | |
|---|---|---|---|
| 5,923,307 | A | 7/1999 | Hogle, IV |
| 2005/0134735 | A1 | 6/2005 | Swartz |
| 2006/0033712 | A1 | 2/2006 | Baudisch et al. |
| 2006/0253797 | A1 | 11/2006 | Madan et al. |
| 2012/0092305 | A1 | 4/2012 | Barnes |
| 2012/0151403 | A1 | 6/2012 | Bhogal et al. |

OTHER PUBLICATIONS

"DPI and Device-Independent Pixels", Published on: Jun. 19, 2012, Available at: <<http://msdn.microsoft.com/en-us/library/windows/desktop/ff684173(v=vs.85).aspx>>, 7 pages.
"Supporting Multiple Screens", Published on: May 14, 2011, Available at:<<http://developer.android.com/guide/practices/screens_support.html>>, 16 pages.
"Two Monitors, Different DPI", Published on: May 3, 2007, Available at <<http://www.navelfluff.org/2007/05/03/two-monitors-different-dpi/>>, 2 pages.
"Writing High-DPI Win32 Applications", Published on: Dec. 27, 2011, Available at <<http://msdn.microsoft.com/en-us/library/windows/desktop/dd464660(v=vs.85).aspx>>, 38 pages.
PCT International Search Report from Application No. PCT/US2013-061018, dated Dec. 4, 2013, 13 pages.

*Primary Examiner* — Abderrahim Merouan
*Assistant Examiner* — Michelle Chin
(74) *Attorney, Agent, or Firm* — Timothy Churna; Judy Yee; Micky Minhas

(57) ABSTRACT

A virtualized coordinate system is determined that describes an alternate monitor space. The virtualized coordinate system is provided to an application providing content to be displayed and the application provides virtualized rendering information including coordinates in the virtualized coordinate system. The virtualized rendering information is scaled for display on the monitor.

20 Claims, 11 Drawing Sheets

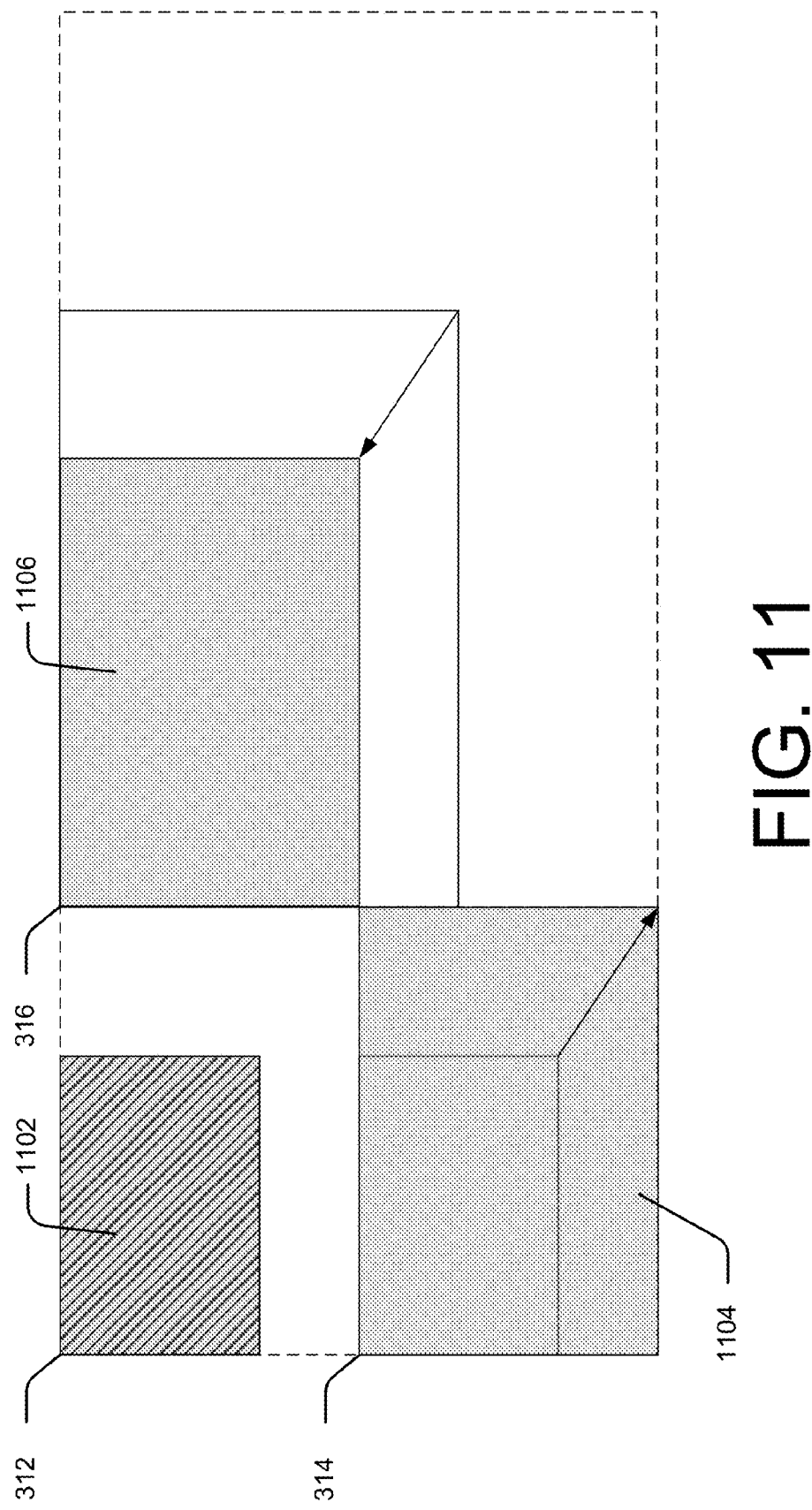

VIRTUALIZING APPLICATIONS FOR PER-MONITOR DISPLAYING

BACKGROUND

Recent technological advancements have made higher density monitors more commonplace. Whereas only relatively recently the majority of monitors were 96 dots-per-inch (DPI), monitors today regularly have a higher pixel density, often approaching 200-300 DPI.

Applications created to render in a 96 DPI environment are conventionally either scaled up for display on a higher DPI monitor, or displayed smaller on the screen. These solutions are generally sufficient when content is to be displayed on a single monitor, but when content is to be displayed also on one or more secondary monitors, such as a projector or a docking station, simple scaling may be insufficient, particularly because the monitors may have different resolutions.

In some conventional multiple monitor systems, a system DPI is established at which all content is rendered. More specifically, if a computer monitor is 192 DPI and an attached projector has a 96 DPI resolution, 192 DPI may be used as a default system DPI. Thus, all content will be rendered at 192 DPI, which, again, has the problem of content showing up much larger (or not at all) on the projector.

SUMMARY

This document describes per-monitor rendering of application content on one or more of a plurality of monitors having different pixel densities. A virtualized coordinate system is created for the plurality of monitors and information for rendering application content is virtualized to the virtualized coordinate space. The virtualized rendering information may be scaled for display on at least one of the monitors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same numbers are used throughout the drawings to reference like features and components.

FIG. 11 is a pictorial diagram that illustrates content having virtualized coordinates for mapping on the monitor arrangement of FIG. 4.

DETAILED DESCRIPTION

Historically, applications were written to render content at a single, static, system-wide DPI. For example, until recently all displays were 96 DPI (or thereabout). Because the displays were uniform and applications rendered content, such as bitmaps, for example, based on physical pixel dimensioning, many applications written in this timeframe were DPI-unaware; they merely rendered content at 96 DPI and that content was mapped directly onto the monitor As monitor technology has advanced, pixel density has increased. Some applications have been written with DPI in mind and query a system for a system DPI at which it will render content. Such applications are referred to herein as static DPI-aware applications.

A drawback of static DPI-aware applications is that, like the DPI unaware applications, they render to a single, static system DPI. This system DPI can be changed, allowing better performance on higher resolution applications. However, static DPI-aware applications (like DPI-unaware applications) cannot accommodate different DPIs within a single system.

In one use case, a user running an application on a high resolution, high-density monitor desiring to show the content on his monitor to others via a low-resolution, low-density projector will find that the content is displayed completely differently (and often unacceptably so) on one or the other of the monitor and the projector, usually depending upon the system DPI.

While some recent work has been done with applications to have them query for a monitor DPI instead of a system DPI, it would be a burdensome task to have every user replace every DPI-unaware and/or static DPI-aware application with a newer application.

In one aspect of this disclosure, an application may be properly mapped on one or more of multiple monitors or on the same monitor, even when the monitor's applied DPI is changed during use, by providing a virtualized coordinate system to the application. By virtualizing the rendering information, i.e., by supplying coordinates in the virtualized coordinate space, the content may be correctly displayed on any of the monitors. As necessary, the content rendered in the virtualized coordinate space may be scaled with respect to an origin of the monitor on which it is to be displayed.

Example Environment

Figure 1:
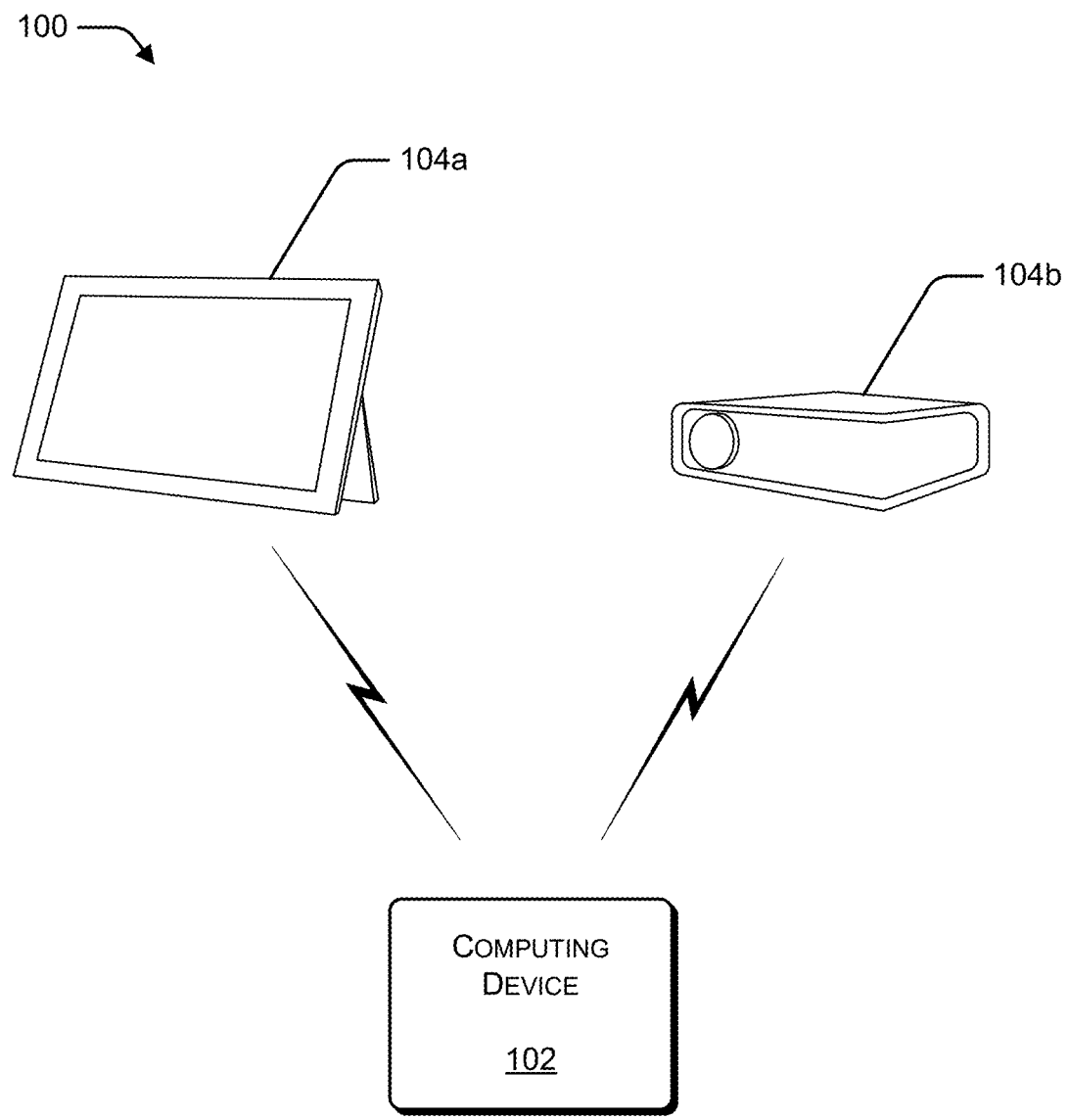
FIG. 1 is a pictorial diagram of an example environment in which per-monitor mapping may be implemented.

FIG. 1 illustrates an example environment 100 in which per-monitor mapping of application content may be implemented. The example environment 100 includes a computing device 102, communicatively coupled to two monitors 104a, 104b. The monitor 104a is embodied as a digital display, such as a computer monitor, and the monitor 104b is embodied as a projector. The monitors 104*a*, 104*b* are representative display devices only. This disclosure is not limited to two monitors. For example, implementations will be described below in the context of three monitors. The disclosure also is not limited to the illustrated monitor-types. Other monitors may include, by way of non-limiting example, monitors associated with mobile phones, tablet computer systems, electronic book readers, multifunctional devices, desktop computer systems, laptop computer systems, game console systems, and personal media players.

Example Computing Device

Figure 2:
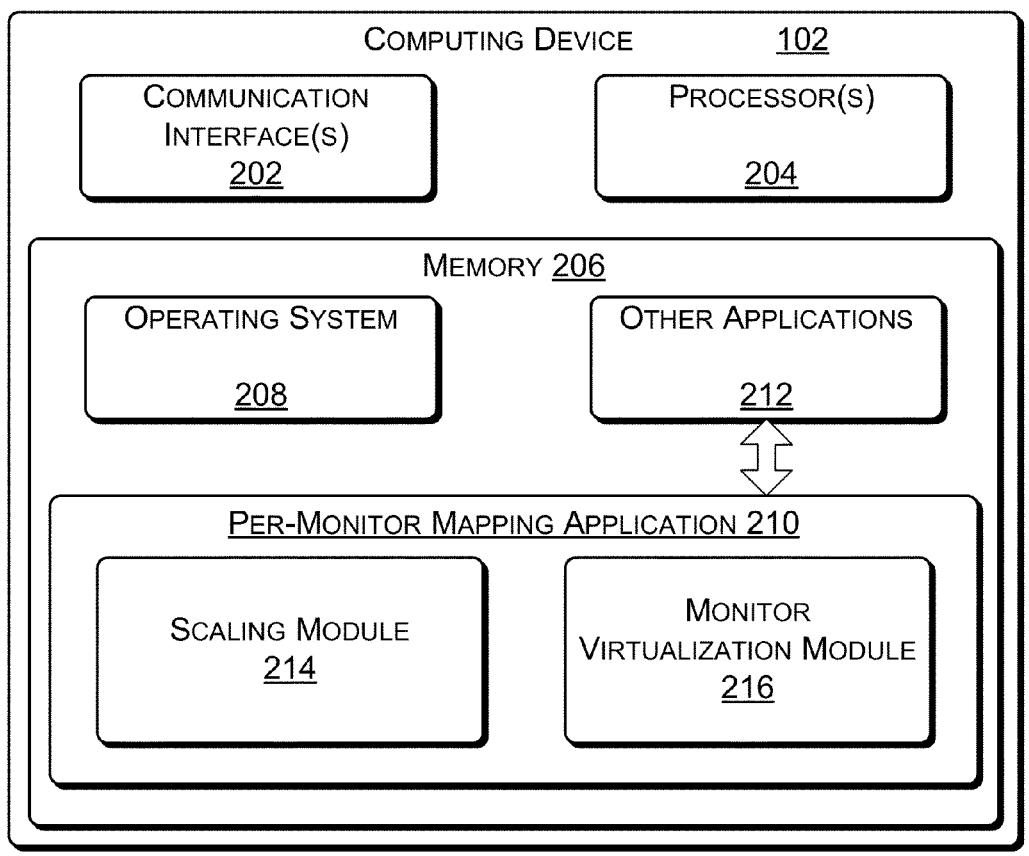
FIG. 2 is a block diagram that illustrates components of an example computing device configured to implement per-monitor mapping.

FIG. 2 illustrates components of an example of the computing device 102 implementing per-monitor mapping as described herein. The computing device 102 represents any type of device that may render content required to be displayed at different resolutions, including, but not limited to, a desktop computer system, a laptop computer system, a tablet computer system, a mobile computing device, and so on. The example computing device 102 includes one or more communication interfaces 202, one or more processors 204, and a memory 206. Communication interfaces 202 enable computing device 102 to communicate with other devices, such as the monitor 104*a* and the projector 104*b*. Communication interfaces 302 may include, but are not limited to, a network interface, audio/video inputs/outputs, a wired interface, and a wireless interface.

The processors 204 are communicatively coupled to the memory 206. The memory 206 may be configured to store one or more software and/or firmware modules, which are executable on the processor(s) 204 to implement various functions. While the modules are described herein as being software and/or firmware executable on a processor, in other embodiments, any or all of the modules may be implemented in whole or in part by hardware (e.g., as an ASIC, a specialized processing unit, etc.) to execute the described functions.

An operating system 208, a per-monitor mapping application 210, and one or more other applications 212 are stored in the memory 206 as computer-readable instructions, and are executed, at least in part, on the processors 204.

The per-monitor mapping application 210 includes a scaling module 214 and a monitor virtualization module 216. The scaling module 214 scales rendering information for proper display of content on each of a plurality of monitors. The monitor virtualization module 216 virtualizes a monitor space, which in some implementations includes a plurality of monitors, by creating a virtualized coordinate system describing the monitor space.

Although illustrated in FIG. 2 as being stored in memory 206 of computing device 102, the per-monitor mapping application 210, or portions thereof, may be implemented using any form of computer-readable media that is accessible by computing device 102. Furthermore, in alternate implementations, one or more components of the operating system 208, the per-monitor mapping application 210, and other applications 212 may be implemented as part of an integrated circuit that is part of, or accessible to, the computing device 102.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, random-access memory (RAM), read-only memory (ROM), electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media includes computer readable instructions, data structures, program modules, or other data in a modulated data signal, such as a carrier wave, or other transmission mechanism. As defined herein, computer storage media does not include communication media.

Example Monitor Array and System-Wide Virtualization

Figure 3:
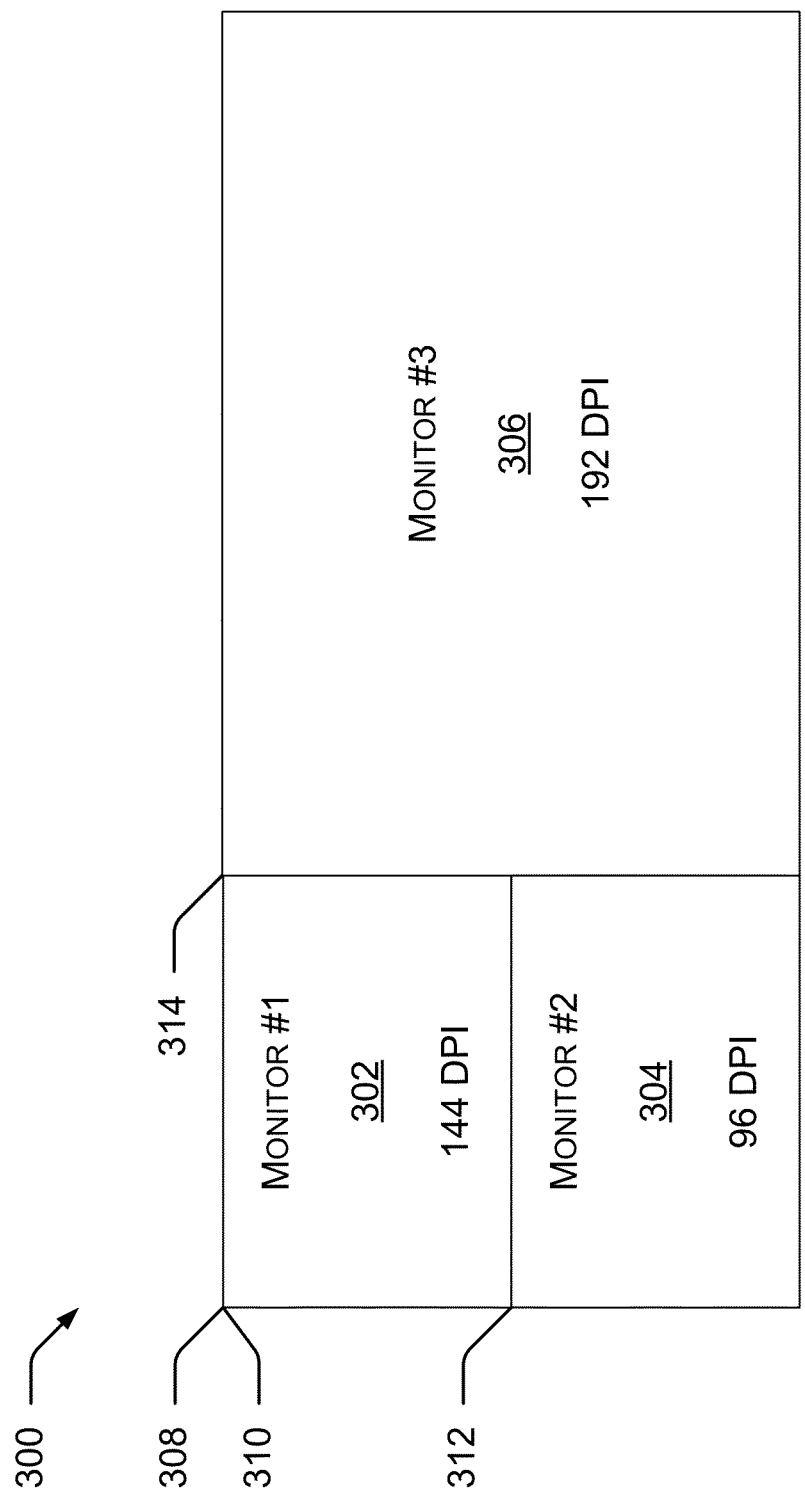
FIG. 3 is a pictorial diagram of an example monitor arrangement in which each of three illustrated monitors has a different DPI value.

FIG. 3 is a representation of an array 300 of three monitors: first monitor 302, second monitor 304, and third monitor 306. The first monitor 302 has a resolution of 144 DPI, the second monitor 304 has a resolution of 96 DPI, and the third monitor 306 has a resolution of 192 DPI. The three monitors 302, 304, 306 are representative in number, size, and DPI, and will be used for purposes of describing embodiments of this disclosure. As will be appreciated by those having the benefit of this disclosure, implementations of the disclosure may include more or fewer monitors and those monitors may be of different sizes and resolutions.

The monitor array 300 has a screen space origin 308, which in one embodiment is a (0,0) coordinate for the monitor space that includes all monitors 302, 304, 306. Each monitor also has its own origin. Specifically, the first monitor 302 has a first monitor origin 310, the second monitor 304 has a second monitor origin 312, and the third monitor has a third monitor origin 314. In this example, the screen space origin 308 is the same physical position as the first monitor origin 310.

Figure 4:
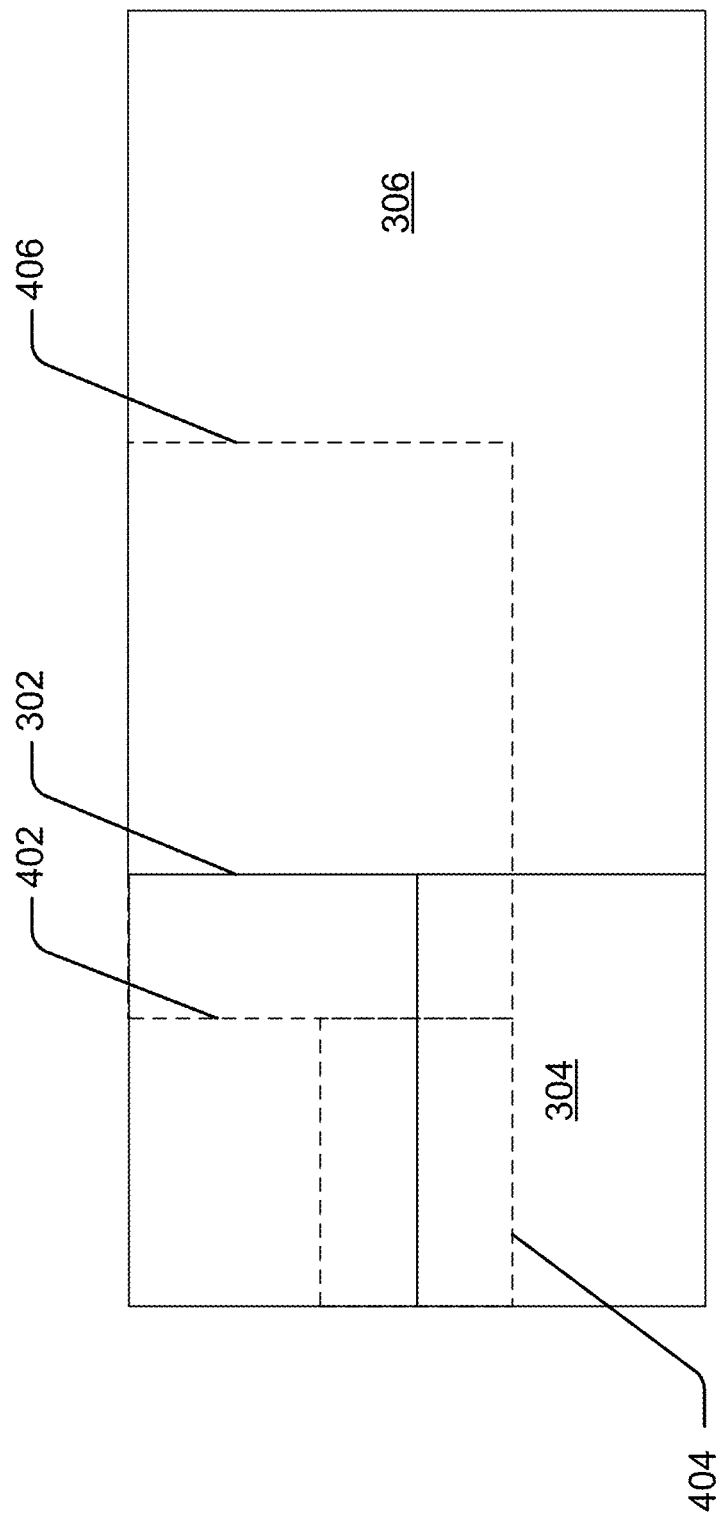
FIG. 4 is a pictorial diagram that illustrates a mapping scheme for the monitor arrangement of FIG. 4.

FIG. 4 illustrates a system-wide virtualization scheme in which content is displayed at a system-wide DPI. In FIG. 4, the same array 300 of monitors 302, 304, 306 is provided. The first monitor 302, having a DPI of 144, is determined to be the primary monitor and its DPI, again 144, is used as the system DPI. Because content in a maximized window rendered at 144 DPI will not fit on the second monitor 304, for example, it is necessary to first virtualize the monitor space that includes all monitors. In FIG. 4, alternate monitor spaces 402, 404, 406 for each of the monitor spaces are illustrated in dashed lines. The alternate monitor spaces 402, 404, 406 are a scaled down (by a 2/3 factor, which is the ratio of the system DPI to the largest per-monitor DPI) version of the original monitor space. A coordinate system describing the alternate monitor spaces 402, 404, 406 is exposed to applications, so any content to be rendered is given in terms of that coordinate system. The rendered information provided by the application is then scaled up to the original monitor space, i.e., for display at 144 DPI to the user.

While this approach works on a system-wide basis, it renders everything at a single, system-wide DPI; it does not allow for per-monitor pixel density variations.

Per-Monitor Virtualization

Figure 5:
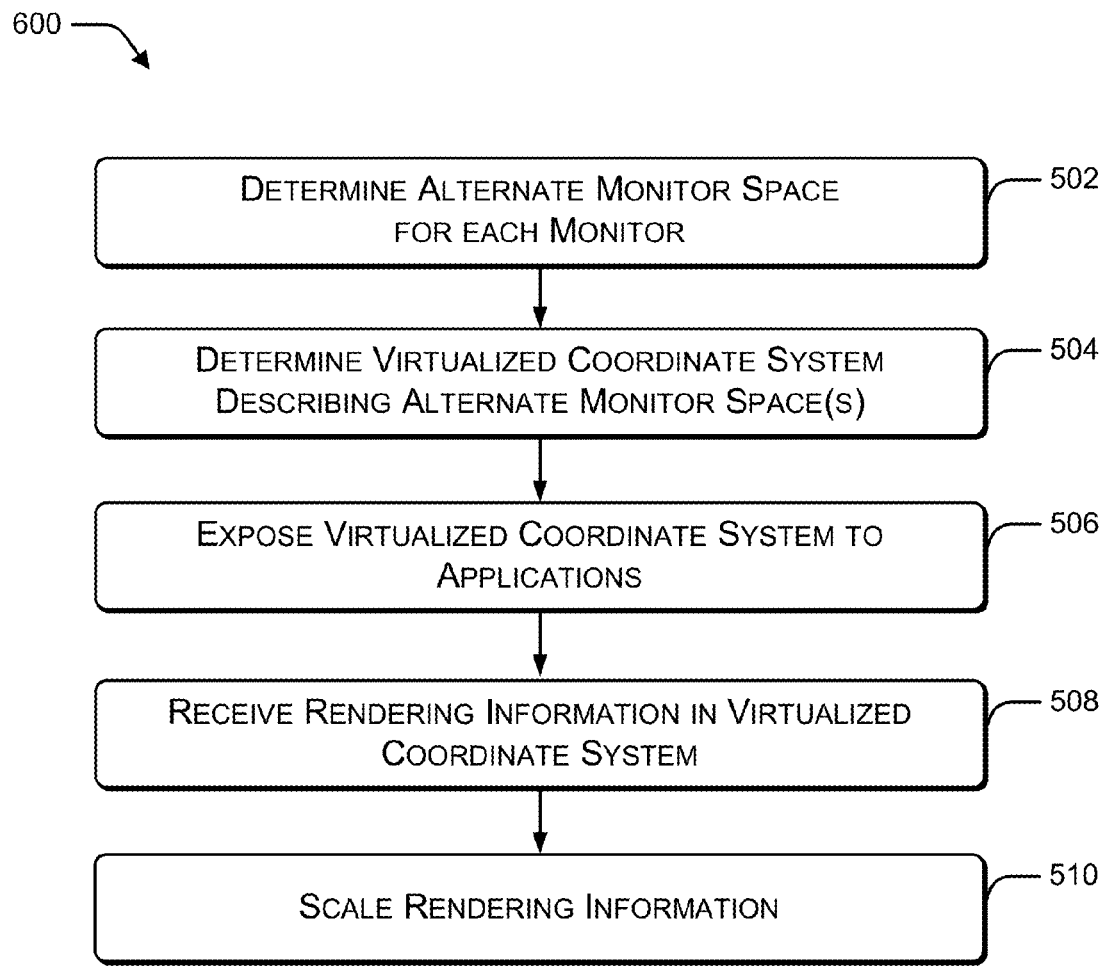
FIG. 5 is a pictorial diagram that illustrates a per-monitor mapping scheme for the monitor arrangement of FIG. 4.

FIG. 5 is a flowchart illustrating a process 500 by which content can be rendered on a per-monitor basis. This process (and others described below) is illustrated as a collection of blocks in a logical flow graph, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while these processes are described with reference to the computing device 102 described above with reference to FIGS. 1 and 2, other computer architectures may implement one or more portions of these processes, in whole or in part.

In block 502, an alternate monitor space is determined for each monitor. As will be described in more detail below, each alternate monitor space, and how it is calculated, may vary depending upon the type of application. More specifically, a different process for determining each alternate monitor space may be employed for DPI-unaware applications than for static DPI-aware applications.

In block 504, a virtualized coordinate system is determined that describes the alternate monitor space(s), and in block 506 the virtualized coordinate system is exposed to applications. In this manner, the application will provide, in block 508, all rendering information in a space defined by the virtualized coordinate system. Thus, the application understands the display space to be different than it actually is, which allows for, at block 510, scaling of the content for appropriate display across monitors of the different DPIs.

Figure 6:
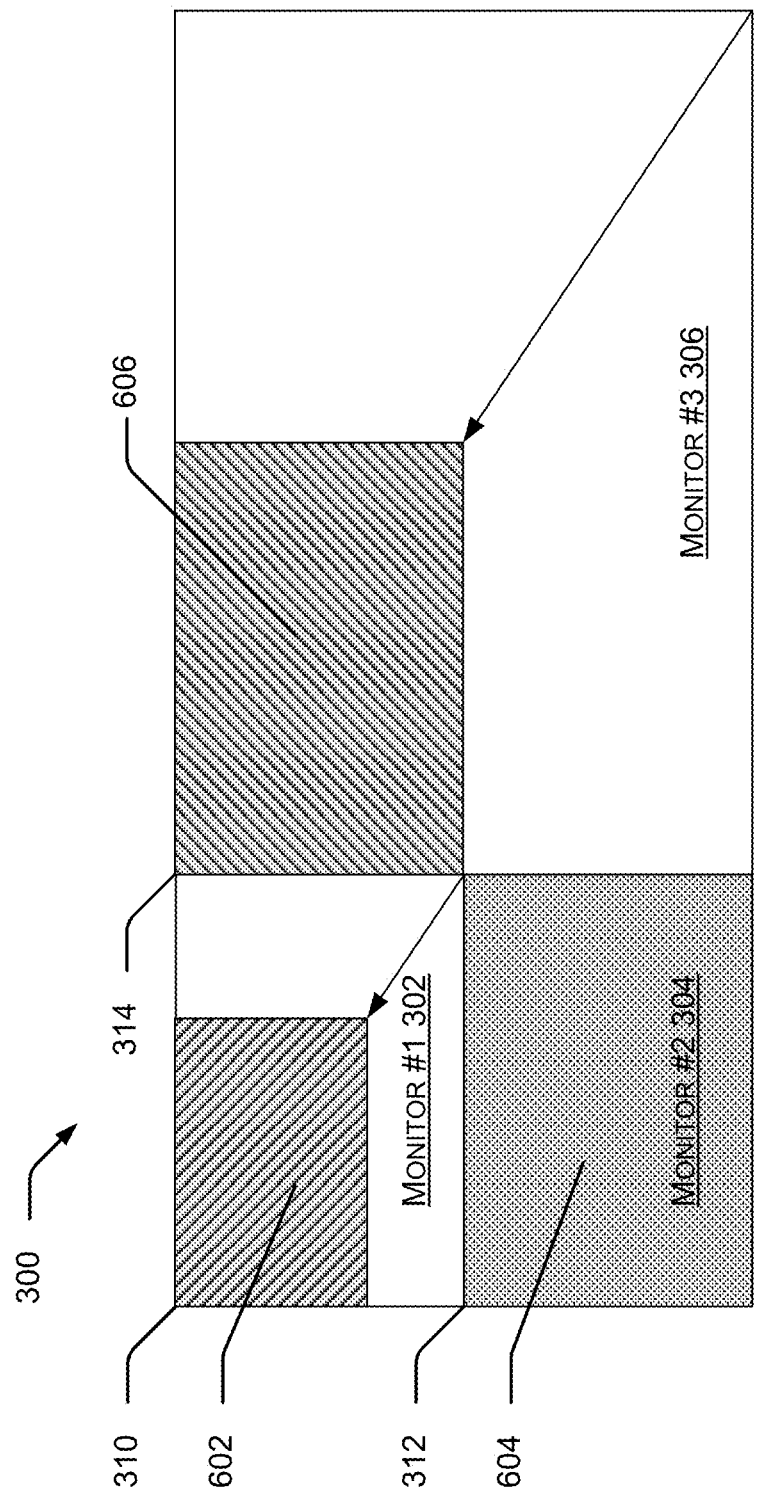
FIG. 6 is a flow diagram of an example process for mapping to-be-displayed content to a monitor.

FIG. 6 will now be used to describe the process of FIG. 6 in the context of per-monitor display of content from DPI-unaware applications. As discussed above, DPI-unaware applications render all content at 96 DPI.

In FIG. 6, the array 300 of monitors 302, 304, 306 introduced in FIG. 3 is illustrated. In the context of the array 300, content from a DPI-unaware application would appear correctly on the second (96 DPI) monitor 304, it would appear smaller than intended on the first monitor 302 and smaller still on the third monitor 306.

To display the content as intended, first, second, and third alternate monitor spaces 602, 604, 606 are defined for the respective first, second, and third monitors 302, 304, 306. Each alternate monitor space 602, 604, 606 corresponds to an actual or original monitor space, scaled by the ratio of the respective monitor 302, 304, 306 to 96 DPI—the resolution at which DPI-unaware apps render content. Thus, the physical size of the first monitor 302 is scaled by a factor of two-thirds (96/144) and the third monitor 306 is scaled by a factor of one-half (96/192) to define the respective first and third alternate monitor spaces 602, 606. Because the second monitor 304 is a 96 DPI monitor, its scale factor is 1.

To determine the alternate monitor spaces 602, 604, 606 each monitor is scaled relative to its respective monitor origin 310, 314, 316 instead of the screen space origin 308. Scaling relative to the screen space origin 308 may yield unsatisfactory results in some implementations, inasmuch as alternate monitor spaces may overlap, which can lead to errors.

Figure 7:
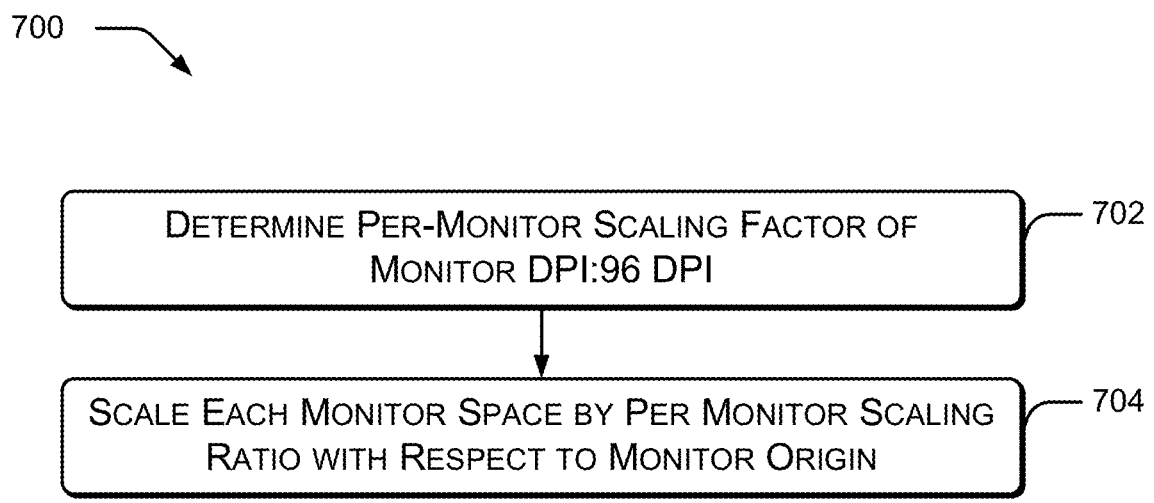
FIG. 7 is a flow diagram of an example process for mapping to-be-displayed content to a monitor in a per-monitor mapping system.

FIG. 7 illustrates the just-described process 700 of determining the alternate monitor spaces for DPI-unaware applications. Specifically, at block 702 a per-monitor scaling ratio is determined. In this embodiment, the scaling ratio is the ratio of a respective monitor's DPI to 96 DPI.

In block 704, the original monitor space of the respective monitor is scaled by the scaling ratio determined in block 702 to determine the alternate monitor space. The original monitor space is scaled with respect to the monitor origin.

Having determined the alternate monitor spaces 602, 604, 606, the virtualized coordinate system is then determined for each, and applications are exposed to that virtualized coordinate system. Thus, any content output by the application will have coordinates in one of the alternate monitor spaces 602, 604, 606. In the illustrated example, content having coordinates in either of the first or third alternate monitor spaces 602, 606 can be scaled up before mapping to the respective first or third monitor 302, 306, i.e., to display as intended on a 96-DPI monitor. Content having coordinates in the second alternate monitor space 604, will be rendered directly, as the second monitor is a 96-DPI monitor.

As noted above, the process just described with reference to FIGS. 5-7 may be used to render content from DPI-unaware apps. Specifically, because we assume that the lowest pixel density of any monitor is 96 DPI, application content, i.e., rendering information, will only ever be scaled up, by a factor of one or greater. The virtualized resolution is always smaller than (or equal to) the physical resolution.

However, content from static DPI-aware applications may require scaling down, i.e., scaling by a factor of less than one. As noted above, for static DPI-aware applications, all content is rendered at a single, system DPI. Thus, for example, when a system DPI is determined to be 150, displaying content rendered at that DPI on a monitor with a density of 96-DPI will lead to unsatisfactory results. The user will likely see less than all of the content on her monitor.

FIGS. 8-11 describe and illustrate an implementation of per-monitor mapping of application content for static DPI-aware applications. At its most general level, the process described above with reference to FIG. 5 applies equally for per-monitor rendering of content from DPI-aware applications, as for content from DPI-unaware applications. More specifically, regardless of the type of application, the application is exposed to a virtualized coordinate system describing an alternate monitor space and it uses the virtualized coordinate system to define content to be rendered. The content then may be scaled with respect to the respective monitor origin.

Figure 8:
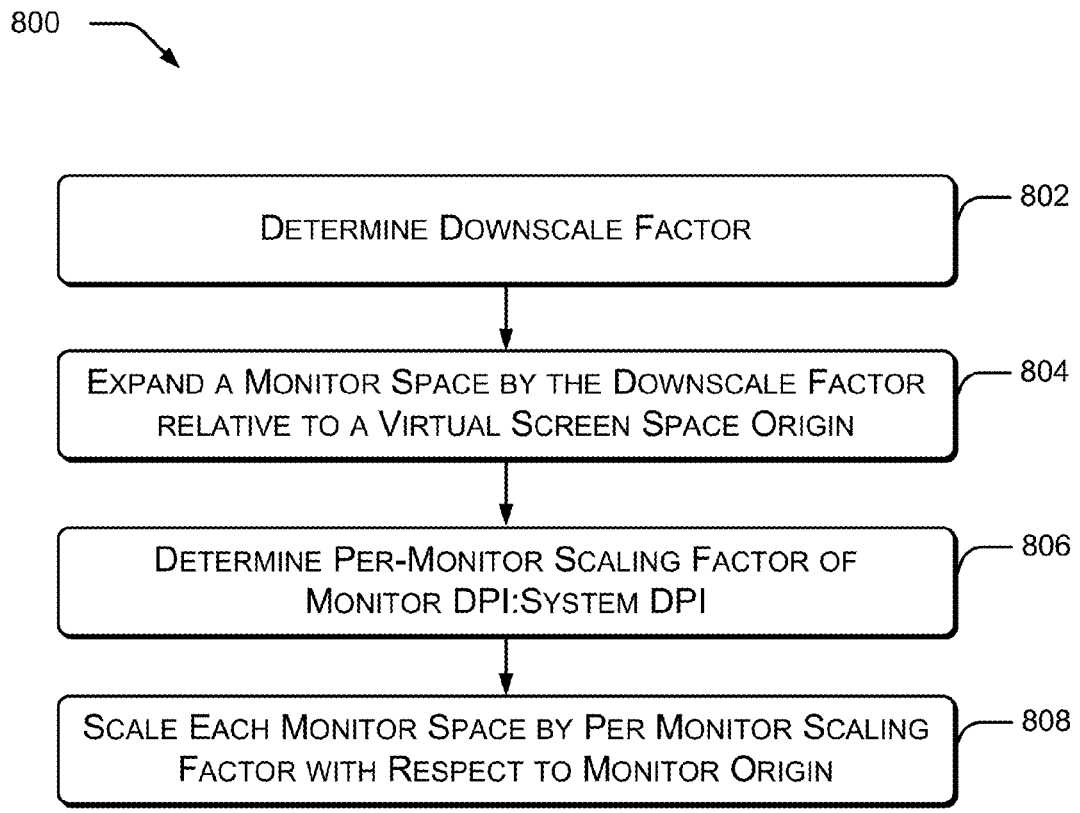
FIG. 8 is a flow diagram of an example process for creating a virtualized coordinate system usable for per-monitor mapping of application content to one or more monitors.

In some implementations, the alternate monitor space is determined differently for static DPI-aware applications than for DPI-unaware applications. FIG. 8 is a flow diagram depicting a process 800 showing one such implementation.

In block 802, a downscale factor is determined. The downscale factor is the largest of the ratios of the system DPI to each respective monitor DPI. So, assuming a system DPI of 144 and the array 300 of FIG. 3, the downscale factor is the largest of 1.0 (144:144 (the DPI of the first monitor 302)), 1.5 (144:96 (the DPI of the second monitor 304)), or 0.75 (144: 192 (the DPI of the third monitor 306)); or 1.5.

In block 804, a monitor space defining each of the monitors 302, 304, 306 is expanded by the downscale factor, relative to the virtual screen space origin 308 to create an expanded monitor space.

Figure 9:
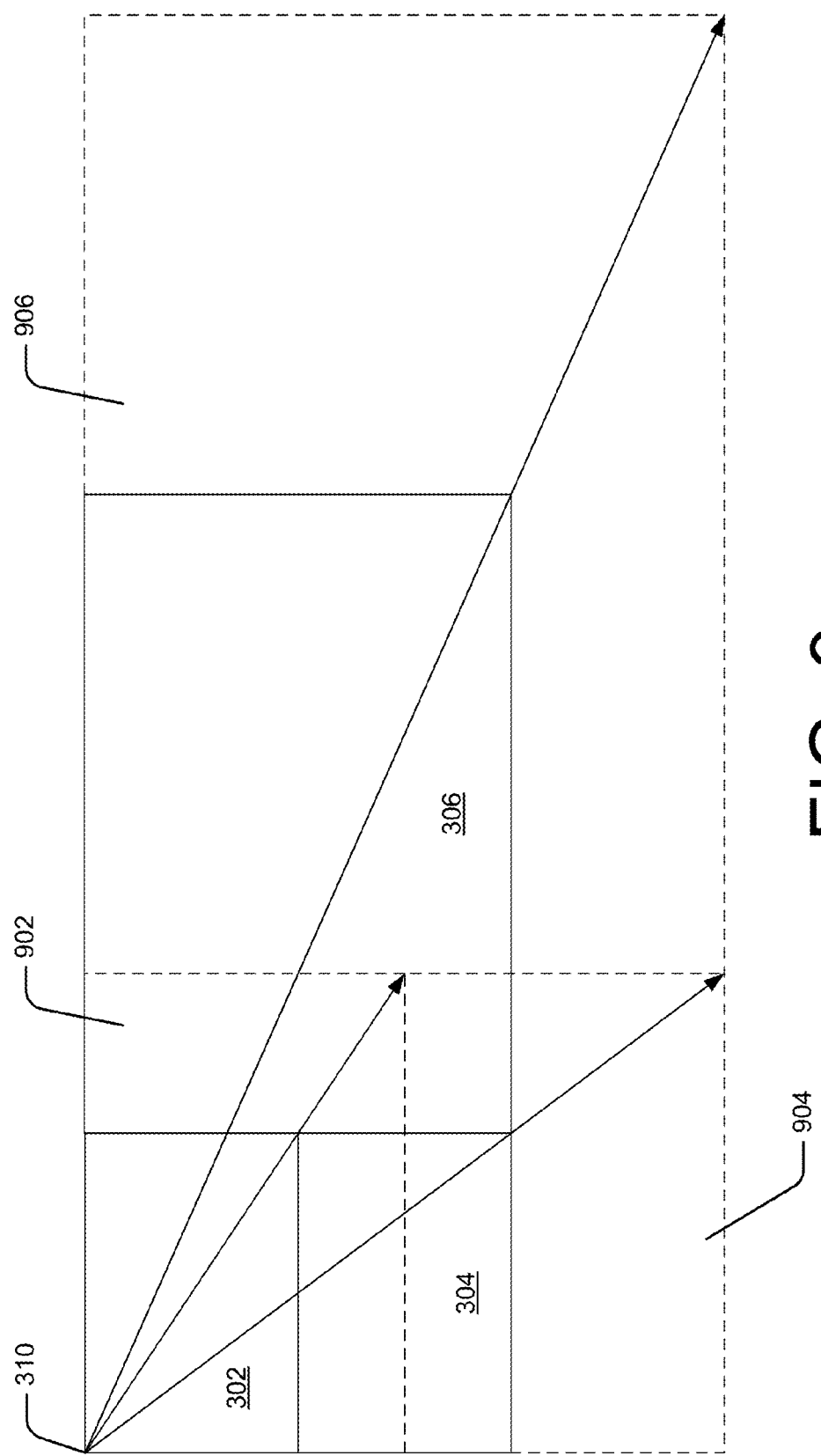
FIG. 9 is a pictorial diagram that illustrates virtual monitor expansion for the monitor arrangement of FIG. 4.
Figure 10:
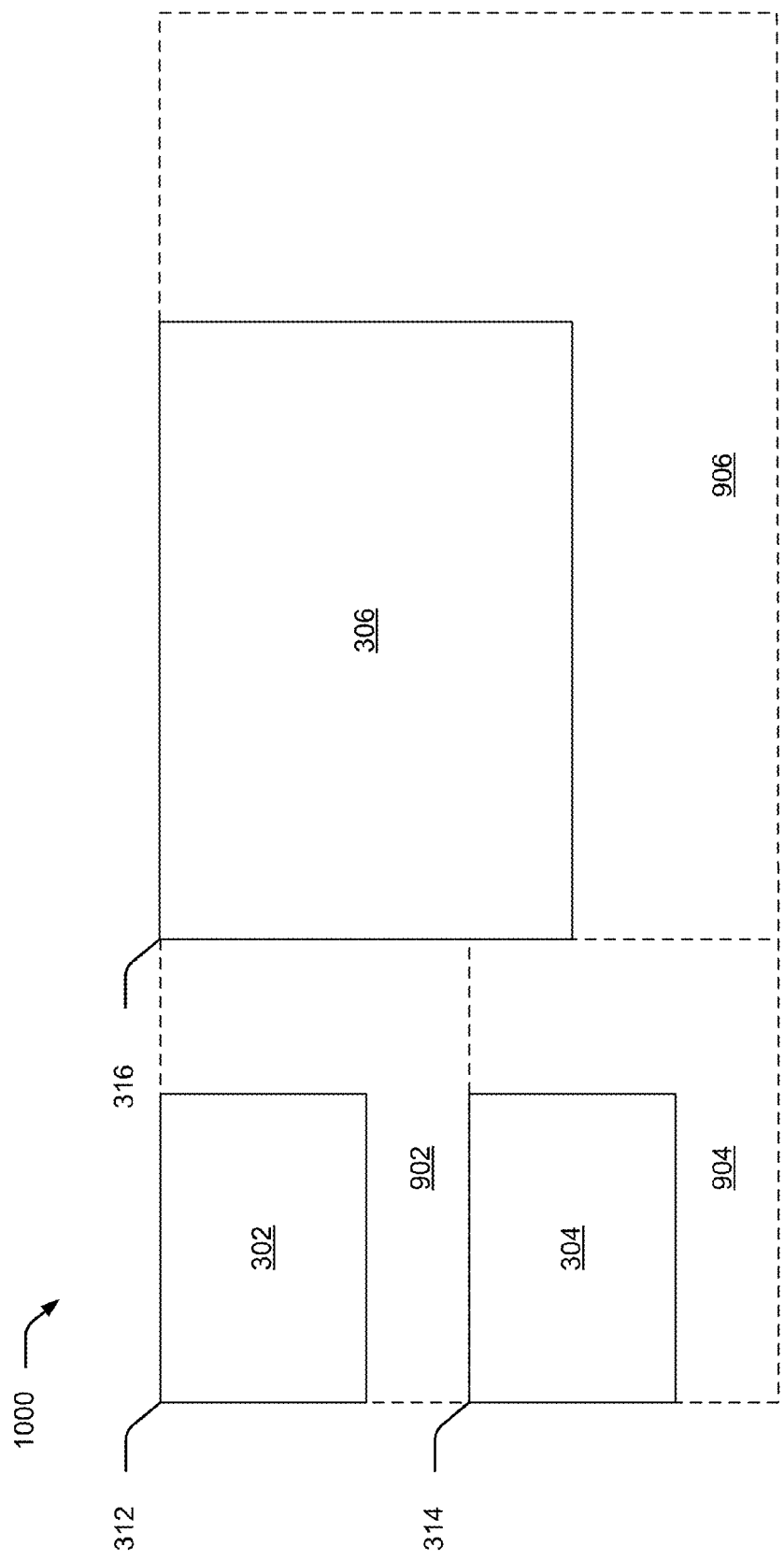
FIG. 10 is a pictorial diagram that illustrates virtual monitor expansion for the monitor arrangement of FIG. 4.

The concept of the expanded monitor space is illustrated in FIGS. 9 and 10, wherein each of the monitors 302, 304, 306, and thus a composite monitor space, is expanded by the downscale factor to create respective expanded monitor spaces 902, 904, 906, each shown in dashed lines.

In FIG. 10, within the expanded monitor space the position of the second and third physical monitors 304, 306 are translated, vertically and horizontally, respectively, to conserve spatial relationships between the monitors' expanded monitor spaces 902, 904, 906.

Returning now to FIG. 8, in block 806 a scaling factor is determined for each monitor space. In this embodiment, the scaling factor is the ratio of the respective monitor's DPI to the system DPI. Thus, for monitor 1 in the embodiment of FIGS. 9 and 10, the scaling ratio is 1.0 (144:144) for the first monitor 302, 0.75 (192:144) for the second monitor 304, and 1.5 (96:144) for the third monitor 306.

In block 808, each of the physical monitor sizes is scaled by its respective scaling factor, with respect to each respective monitor origin 310, 312, 314, to determine an alternate monitor space for each monitor. The textured boxes in FIG. 11 represent an alternate monitor spaces 1102, 1104, 1106 for each of respective monitors 302, 304, 306.

As with the previous embodiments discussed above, once the alternative monitor space is determined, a virtualized coordinate system can be assigned to describe that space. The virtualized coordinate system is exposed to applications, which read and provide coordinates relative to that system. Accordingly, any content output by the application will have coordinates in one of the alternate monitor spaces 1102, 1104, 1106. In the illustrated example, content having coordinates in the third alternate monitor space 1106 may be scaled up before mapping to the third monitor 306, i.e., to display as intended on a 144-DPI monitor. Similarly, content having coordinates in the second alternate monitor space 1104 may be scaled down before mapping to the second monitor 304. Content having coordinates in the first alternate monitor space 1102, will be rendered directly, as the first monitor is a 144-DPI monitor.

Note that in the embodiment described with respect to FIGS. 8-11, the system resolution was higher than the actual resolution of the second monitor 304, thus requiring subsequent downscaling of the content (and necessitating the expanded monitor space).

Throughout this disclosure, "resolution," "DPI," "density," "pixel density," and similar terms to describe properties of monitors are used. While these and other properties may be defined by specifications of the monitor, they may also be user-define, or applied, properties. Thus, for example, a monitor may be capable of displaying content at more than one resolution, which resolution may be dictated by a user. As a result, in one implementation of this disclosure, virtualization of rendering information may be implemented upon a user changing a property of a monitor, such as its resolution. This may enable a more user-friendly experience, inasmuch as the change in resolution will take effect immediately, instead of requiring a reboot of the user's computing device.

As will be appreciated with the benefit of this disclosure, applications are provided with a virtualized coordinate system so content can be appropriately displayed across multiple resolutions. In interfacing with these applications for purposes of responding to queries or for displaying content, for example, it will be necessary to convert between the physical and logical coordinate spaces. Moreover, as noted above, scaling is done according to aspects of this disclosure relative to monitor origins. Accordingly, before a point (x, y) on a monitor with logical origin (Lx, Ly) and physical origin (Px, Py) is scaled, its monitor space must be translated so that (0, 0) is the monitor origin, as follows:

$$(x'\ y'\ 1) = (x\ y\ 1)\begin{pmatrix} 1 & 0 & 0 \\ 0 & 1 & 0 \\ -Lx & -Ly & 1 \end{pmatrix} \quad (1)$$

Then the scaling can be applied using:

$$(x''\ y''\ 1) = (x'\ y'\ 1)\begin{pmatrix} S & 0 & 0 \\ 0 & S & 0 \\ 0 & 0 & 1 \end{pmatrix} \quad (2)$$

Coordinates can then be translated to the physical monitor origin:

$$(x'''\ y'''\ 1) = (x''\ y''\ 1)\begin{pmatrix} 1 & 0 & 0 \\ 0 & 1 & 0 \\ Px & Py & 1 \end{pmatrix} \quad (3)$$

Multiplying these three matrices in that order yields one transform for the logical to physical conversion:

$$\begin{pmatrix} S & 0 & 0 \\ 0 & S & 0 \\ Px - SLx & Py - SLy & 1 \end{pmatrix} \quad (4)$$

The inverse of this will yield the physical to logical conversion:

$$\begin{pmatrix} 1/S & 0 & 0 \\ 0 & 1/S & 0 \\ (SLx - Px)/S & (SLy - Py)/S & 1 \end{pmatrix} \quad (5)$$

CONCLUSION

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A system comprising:
a plurality of monitors, at least two of the monitors having different pixel densities from each other;
a computing device communicatively coupled to the plurality of monitors, the computing device comprising:
a monitor communication interface for receiving from each of the plurality of monitors a pixel density and a monitor origin for the respective monitor;
a monitor virtualization module to define a virtualized coordinate system for each of the plurality of monitors, wherein the virtualized coordinate system describes an alternate monitor space for each of the plurality of monitors;
an application interface for providing, to an application, the virtualized coordinate system and for receiving, from the application, virtualized rendering information comprising rendering information of application content to be displayed on at least one of the plurality of monitors in the virtualized coordinate system; and
a scaling module to scale the virtualized rendering information for display on the one or more of the plurality of monitors on which the application content is to be displayed, wherein rendering information for each of the plurality of monitors is scaled by a scaling factor to form the alternate monitor space and the scaling factor is a per-monitor scaling factor based at least in part on a monitor pixel density and a system-wide pixel density.

2. The system of claim 1, wherein the per-monitor scaling factor comprises a ratio of the monitor pixel density to the system-wide pixel density.

3. The system of claim 1, wherein the scaling rendering information for each of the plurality of monitors is scaled relative to a respective monitor origin.

4. The system of claim 1, wherein the virtualized coordinate system describes, at least in part, an expanded monitor space comprising an expansion of a monitor space defined by each of the plurality of monitors.

5. The system of claim 4, wherein the expansion comprises an expansion of the monitor space by a maximum downscale factor.

6. The system of claim 5, wherein the maximum downscale factor is the ratio of an applied system resolution to a resolution of one of the plurality of monitors.

7. The system of claim 4, wherein the expansion comprises an expansion of the monitor space relative to a virtual screen space origin.

8. The system of claim 1, wherein the computing device further comprises a mapping module for mapping the scaled, virtualized rendering information to the one or more of the plurality of monitors on which the application content is to be displayed.

9. The system of claim 1, wherein the pixel density of each of the plurality of monitors is an applied pixel density of the respective monitor.

10. The system of claim 1, wherein the scaling module scales the virtualized rendering information relative to a monitor origin of the one or more of the plurality of monitors on which the application content is to be displayed.

11. A method comprising:
virtually expanding a monitor space of at least one monitor on which content is to be displayed to form an expanded monitor space by expanding a coordinate system of the monitor space by a maximum downscale factor, the maximum downscale factor based at least in part on an applied pixel density of the monitor and a system-wide pixel density;
determining an alternate monitor space at least partly in the expanded monitor space;
determining a virtualized coordinate system describing the alternate monitor space;
providing the virtualized coordinate system to an application providing content to be displayed;
receiving, from the application, rendering information comprising coordinates in the virtualized coordinate system; and scaling the rendering information for display on the monitor.

12. The method of claim 11, wherein the maximum downscale factor is a ratio between an applied pixel density of the monitor and a system-wide pixel density.

13. The method of claim 11, further comprising receiving a user input necessitating a change in a display resolution of the content.

14. The method of claim 13, wherein the user input is a change in an applied system resolution or an instruction to display a portion of the content on a different monitor.

15. A computing device comprising:
one or more processors;
a monitor communication interface for receiving from a plurality of monitors a pixel density for each respective monitor, the plurality of monitors defining a monitor space;
computer storage media storing instructions that are executable by the one or more processors to perform operations comprising:
defining a virtualized coordinate system for each of the plurality of monitors, the virtualized coordinate system comprising an expanded monitor space defined by the plurality of monitors, wherein the expanded monitor space comprises an expansion of the monitor space by a maximum downscale factor based at least in part on an applied system resolution and a resolution of one of the plurality of monitors;
providing, to an application, the virtualized coordinate system and receiving, from the application, virtualized rendering information comprising rendering information of application content to be displayed on at least one of the plurality of monitors in the virtualized coordinate system; and
scaling the virtualized rendering information for display on the one or more of the plurality of monitors on which the application content is to be displayed.

16. The computing device of claim 15, wherein the maximum downscale factor is the ratio of an applied system resolution to a resolution of one of the plurality of monitors.

17. The computing device of claim 15, wherein the expansion comprises an expansion of the monitor space relative to a virtual screen space origin.

18. The computing device of claim 15, the operations further comprising:
mapping the scaled, virtualized rendering information to the one or more of the plurality of monitors on which the application content is to be displayed.

19. The computing device of claim 15, wherein the pixel density of each of the plurality of monitors is an applied pixel density of the respective monitor.

20. The computing device of claim 15, wherein the scaling further comprises scaling the virtualized rendering information relative to a monitor origin of the plurality of monitors on which the application content is to be displayed.

* * * * *